(12) United States Patent
Frydendal

(10) Patent No.: US 10,161,387 B2
(45) Date of Patent: Dec. 25, 2018

(54) DAMPER OF A WIND TURBINE

(71) Applicant: SIEMENS AKTIENGESELLSCHAFT, Munich (DE)

(72) Inventor: Lb Frydendal, Fovling (DK)

(73) Assignee: SIEMENS AKTIENGESELLSCHAFT (DE)

( * ) Notice: Subject to any disclaimer, the term of this patent is extended or adjusted under 35 U.S.C. 154(b) by 1055 days.

(21) Appl. No.: 14/560,027

(22) Filed: Dec. 4, 2014

(65) Prior Publication Data

US 2015/0211496 A1 Jul. 30, 2015

(30) Foreign Application Priority Data

Jan. 28, 2014 (EP) .................................... 14152887

(51) Int. Cl.
| | |
|---|---|
| *F03D 11/04* | (2006.01) |
| *F03D 80/80* | (2016.01) |
| *F03D 80/50* | (2016.01) |
| *F03D 80/00* | (2016.01) |
| *F03D 13/20* | (2016.01) |
| *E04B 1/98* | (2006.01) |

(52) U.S. Cl.
CPC .............. *F03D 11/04* (2013.01); *F03D 13/20* (2016.05); *F03D 80/00* (2016.05); *F03D 80/50* (2016.05); *F03D 80/80* (2016.05); *E04B 1/985* (2013.01); *F05B 2240/40* (2013.01); *F05B 2260/964* (2013.01); *Y02E 10/726* (2013.01)

(58) Field of Classification Search
CPC .......... F03D 11/04; F03D 13/20; F03D 80/00; E04B 1/985; F05B 2240/40; F05B 2260/964; Y02E 10/726
See application file for complete search history.

(56) References Cited

U.S. PATENT DOCUMENTS 4,887,398 A * 12/1989 Lenten .................... E02D 27/34
248/562
4,951,441 A 8/1990 Shinichi
(Continued)

FOREIGN PATENT DOCUMENTS

| CN | 101493704 A | 7/2009 |
|---|---|---|
| CN | 102418675 A | 4/2012 |

(Continued)

OTHER PUBLICATIONS

Extended European Search Report for EP Application No. 14152887.7, dated Jun. 17, 2014.
(Continued)

*Primary Examiner* — Igor Kershteyn
(74) *Attorney, Agent, or Firm* — Schmeiser, Olsen & Watts LLP

(57) ABSTRACT

A damper of a wind turbine, wherein the damper is suited for damping a movement of the wind turbine is provided. The damper includes a container and a liquid, wherein the liquid is located inside the container. The damper can be substantially the shape of a toroid. The container further includes a first toroidal segment and at least a second toroidal segment. Both toroidal segments are attached together such that a closed toroid is generated and the liquid is retained inside the container.

16 Claims, 6 Drawing Sheets

(56) References Cited

U.S. PATENT DOCUMENTS

| | | | |
|---|---|---|---|
| 8,123,484 B2* | 2/2012 | Choi | F03D 13/20 |
| | | | 416/145 |
| 2006/0147306 A1* | 7/2006 | Zheng | F16F 7/10 |
| | | | 416/1 |
| 2009/0148289 A1 | 6/2009 | Edenfeld | |
| 2010/0314883 A1* | 12/2010 | Ollgaard | F03D 80/00 |
| | | | 290/55 |
| 2012/0076652 A1 | 3/2012 | Ventzke et al. | |

FOREIGN PATENT DOCUMENTS

| | | | | |
|---|---|---|---|---|
| EP | 0686733 A1 | 12/1995 | | |
| EP | 1677003 A2 | 7/2006 | | |
| EP | 1855000 A1 | 11/2007 | | |
| SU | 992683 A1 * | 1/1983 | | E04B 1/98 |
| WO | WO 2009068599 A2 | 6/2009 | | |

OTHER PUBLICATIONS

Chinese Office Action for CN application No. 201510042608.5, dated May 11, 2018.

* cited by examiner

DAMPER OF A WIND TURBINE

CROSS-REFERENCE TO RELATED APPLICATIONS

This application claims priority to EP 14152887.7, having a filing date of Jan. 28, 2014, the entire contents of which are hereby incorporated by reference.

FIELD OF TECHNOLOGY

The following relates to a damper of a wind turbine which is suited for damping a movement of the wind turbine.

BACKGROUND

Wind turbines usually comprise a tall and slender tower. At the top of the tower, the nacelle, which is housing the generator and the rotor, is located. Additionally, the hub with the rotor blades is located at the top of the tower. Thus, the center of mass of the wind turbine is positioned relatively high above the ground. Consequently, the wind turbine is prone to movements, for instance due to wind loads or earthquakes. Wind loads comprise continuous wind flow as well as extreme wind gusts. These movements of the wind turbine are normally undesired as they add structural damages to the wind turbine.

Thus, the development of a system to damp these undesired movement of the wind turbine is an active field of research. A commonly used design of a damper for a wind turbine tower is a flat circular disc which, for instance, has a hole in the middle. The flat circular disc may have a liquid inside which damps linear motion of the wind turbine tower by providing the liquid sloshing from side to side. The damping of a circular or elliptical movement of the wind turbine tower is provided by a liquid wave moving along the rim of the damper.

In the state of the art, the flat circular disc is manufactured in one piece and is usually made of plastic.

Such a liquid damper, however, has several disadvantages. First, it cannot be disassembled easily. As a consequence, transport of the damper from the production site to the installation site as well as the installation of the damper itself is complex and costly. Furthermore, a replacement or a repair of the damper is difficult, if not impossible at all.

Another disadvantage of a damper which is manufactured in one single piece is that redesigning the damper is complex and costly as it has to be carried out for each new wind turbine type. In other words, an adaption of the design of the damper is costly as no standard elements can be used. As an example, new manufacturing moulds have to be created for each new design of a damper.

These disadvantages and problems have been solved up to now by, for instance, using several small dampers. Small dampers are easier to transport and to install in the wind turbine. The problem of a difficult replacement and repair of a damper according to the state of the art has been solved up to now by accepting certain leakage of dampers, particularly of large dampers which can hardly be replaced.

However, these solutions are not satisfying as they actually do not overcome the existing problems and disadvantages.

Thus, there is a need for a damper that is easy to integrate in a wind turbine, and, if once incorporated to the wind turbine, is easy to disassemble again, e.g. for repair.

SUMMARY

Embodiments of the invention provide a damper of a wind turbine, wherein the damper is suited for damping a movement of the wind turbine. The damper comprises a container and a liquid, wherein the liquid is located inside the container. The damper comprises substantially the shape of a toroid. The container comprises a first toroidal segment and at least a second toroidal segment. Both toroidal segments are attached together such that a closed toroid is generated and the liquid is retained inside the container.

Embodiments of the invention facilitate by means of the segmented design of the container, transportation, assembling and disassembling, wholly or partly. As a consequence, common factual restrictions regarding the size of the damper are overcome. Additionally, by possibly using standard elements as toroidal segments, an adaption to new design requirements is facilitated, too. Finally, a strong and simple geometry of the damper is provided.

In the context of this application, a wind turbine refers to a device that converts mechanical energy, in particular rotational energy, from the wind into electric energy. A wind turbine may also be denoted as a wind power plant.

The described damper is well-suited to damp a movement of the wind turbine. This includes a linear movement, which is substantially perpendicular to the tower of the wind turbine. This also includes circular or elliptical movement of the wind turbine. Furthermore, this includes movement in a vertical direction, i.e. in the direction of the tower, as well as any combination of movements. A toroid is informally also denoted as a donut-shaped object. An example of a toroid is an O-ring. A toroid has an annular shape and is generated by revolving a plane geometrical figure about an axis of rotation which is external to that figure and which is parallel to the plane of the figure and which does not intersect the figure. Note that in general this plane geometrical figure can have any shape. As a first example, if that geometrical figure is a rectangle and if that rectangle is rotated about the axis of rotation, then a hollow cylinder is produced. As a second example, if a circle is rotated about the common axis of rotation, then the toroid is also referred to as a torus.

The container comprises a plurality of toroidal segments which are attached together. If the container only comprises two toroidal segments, namely the first toroidal segment and the second toroidal segment, then both ends of the first toroidal segment are attached to both ends of the second toroidal segment, respectively. If, as another example, the container comprises the first toroidal segment, the second toroidal segment and a third toroidal segment, then the first toroidal segment is attached to the second toroidal segment, the second toroidal segment is attached to the third toroidal segment, and the third toroidal segment is attached to the first toroidal segment, such that at the end a closed toroid is generated by the three attached toroidal segments.

The notion of a substantially toroidal shape of the damper has to be understood such that small deviations of the shape of the damper with regard to an ideal toroid are also comprised by this description.

In an advantageous embodiment, the toroid is symmetric about an axis of symmetry. The shape of the toroid is generated by revolving an ellipse, in particular a circle, about the axis of symmetry.

A toroid with an elliptical, in particular circular cross section benefits from a particularly high structural strength. In other words, a toroid with such a shape can particularly well withstand mechanical forces acting on it. Additionally, such a shape is advantageous if implemented to a circular tower or other element of the wind turbine.

In contrast to that, a toroid wherein the shape of the toroid is generated by revolving a rectangle is, for instance, advantageous if the damper is placed inside the nacelle of the wind turbine.

In another advantageous embodiment, the wind turbine comprises a tower, and the damper is located at the tower.

In order to harvest the most energy out of the wind it is advantageous to place the rotor with the rotor blades elevated from the ground. In other words, it is advantageous if the rotor is placed upon a tower. State of the art wind turbines commonly have a tower with a circular cross section, the cross section being taken in a horizontal plane, i.e. substantially parallel to the ground where the wind turbine is erected.

In an advantageous embodiment, the damper comprises an aperture at its center which is large enough to give space to an elevator of the tower, wherein the elevator connects the base of the tower with the top of the tower. The damper is located inside the tower.

In other words, it is advantageous if the container has an aperture around the axis of symmetry with a certain size. It is particularly advantageous if the elevator, which connects the ground and the top of the tower, fits into the aperture. Likewise, if the wind turbine comprises stairs or a ladder instead of an elevator, it is advantageous if the aperture is large enough to give space to the stairs or the ladder, respectively.

It is further advantageous if the damper is located at the top of the tower or close to the top of the tower. This is advantageous as oscillations of the tower are usually the largest at the top of the tower. Thus, a system for damping is most efficient at the top of the tower.

In another advantageous embodiment, the damper extends to inner walls of the tower.

As the tower walls always have a certain thickness, an inner surface of the walls, also denoted as inner walls, as well as an outer surface of the walls, which is also referred to as outer walls, can be assigned to the tower. It may be advantageous to extend the damper as much as possible to the inner walls of the tower. Note that due to the segmented design more design possibilities are feasible and thus large liquid dampers which extend until the inner walls of the tower are also feasible.

As an example, if the diameter of the inner walls of the tower is 8 meters, the damper may have an outer diameter of 8 meters and an inner diameter of 2 meters. This means that an aperture of 2 meters is present at the center and the remaining space in the tower is filled with the damper, at least within the chosen plane where the damper is placed.

In another advantageous embodiment, the damper is located outside of the tower.

This may be advantageous if, for instance, not enough space inside the tower is available. An external damper may also be advantageous if the damper is only installed temporarily. A temporary damper is e.g. advantageous if the damper is only required during installation of the wind turbine. In that case, for example, an external damper might be used during building up the tower and removed as soon as the wind turbine has been entirely assembled and built up.

In another advantageous embodiment, the wind turbine comprises a nacelle, and the damper is placed at the nacelle.

The nacelle houses the generator, the rotor and may in addition house or accommodate further devices for the functioning of the wind turbine. It may be beneficial to place the damper within the nacelle.

In another advantageous embodiment, the liquid is mixed with clay and/or silt.

In other words, the container comprises the liquid and clay and/or silt. The advantage of having the liquid mixed with the clay and/or the silt is an increase in the mass which may change the damping properties of the damper in an advantageous manner. In particular, this relates to an increase of the mass of the liquid.

In general, it may be advantageous to have a heavy liquid in the damper.

In another advantageous embodiment, the liquid comprises a coolant, such as glycol, in order to prevent the liquid from freezing.

In another advantageous embodiment, the filling level of the liquid inside the container is between 20% and 80%, in particular between 30% and 70%.

The filling level is defined by the height of the liquid in relation to the total vertical diameter of the container. The filling level is determined during non-movement of the wind turbine. The filling level has a direct impact of the frequency of the damper. In other words, the filling level has a direct impact of the frequency with which the liquid reacts if set in motion by the movement of the wind turbine. A high filling level implicates a high frequency, while a low filling level results in a low frequency. If the filling level is very small, the impact and damping ability of the damper may be small, too. However, if the filling level is too high, the damping impact of the damper may be reduced, too, due to sloshing of the liquid to the vertical or top limitation of the container.

In another advantageous embodiment, the first toroidal segment and the second toroidal segment are attached together by means of an assembly flange, which is in particular made of steel.

For instance, the toroidal segments might be made of plastic, while the assembly flange might be a bolted steel assembly flange. In order to ensure a tight and solid connection, gaskets may be introduced between two adjacent parts of the assembly flange. Note that assembly flanges and gaskets are readily available standard objects. This makes the container easy to manufacture and inexpensive. In contrast to the state of the art no individual design and manufacturing is necessary.

In another advantageous embodiment, the damper comprises at least one flow obstacle inside the container.

It has been found that flow obstacles, which are also referred to as valves or baffles, might increase the damping capacity of the damper. The flow obstacle might have the shape or design of just a plate that decreases the diameter of the toroidal segment, thus preventing a flow of the liquid from one part of the damper to another part. The flow obstacle may also have the shape and the design of a membrane.

Advantageously, the flow obstacle is placed at the assembly flange.

If the container comprises a plurality of assembly flanges, it may be beneficial to add a flow obstacle to each of the assembly flanges.

In another advantageous embodiment, the container comprises toroidal segments which are shaped as bent toroidal segments.

The bent toroidal segments are also referred to as bent pipe sections or turn pipes. Depending on the size of the liquid damper and the size of the industrially available bent toroidal segments, the container may comprise only a few bent toroidal segments or it may comprise a large number of bent toroidal segments.

In another advantageous embodiment, the container comprises toroidal segments which are shaped as bent toroidal segments and further toroidal segments which are shaped as straight toroidal segments.

Straight toroidal segments are also referred to as straight pieces of pipe. Note again, that the complete number of used toroidal segments, bent ones as well as straight ones, depend on the design and the size of the damper as well as the availability of industrially available toroidal segments.

In another advantageous embodiment, the number of bent toroidal segments equals the number of straight toroidal segments. Each bent toroidal segment is directly neighbored by a straight toroidal segment.

In other words, the toroidal segments are arranged such that each bent toroidal segment is adjacent to a straight toroidal segment and vice versa.

In another advantageous embodiment, the container comprises a hole for evacuating the liquid from the container.

An evacuation of the container might be necessary if leakage of the liquid out of the container is noticed. Then, it is advantageous if a possibility of a controlled evacuation of the remaining liquid inside the container is possible. After having evacuated the container one or more toroidal segments may be removed and replaced by new toroidal segments such that the leakage is repaired. Finally a refill of the liquid may be possible by the same hole by which the evacuation has taken place.

BRIEF DESCRIPTION OF THE DRAWINGS

Some of the embodiments will be described in detail, with reference to the following figures, wherein like designations denote like members, wherein.

DETAILED DESCRIPTION

Figure 1:
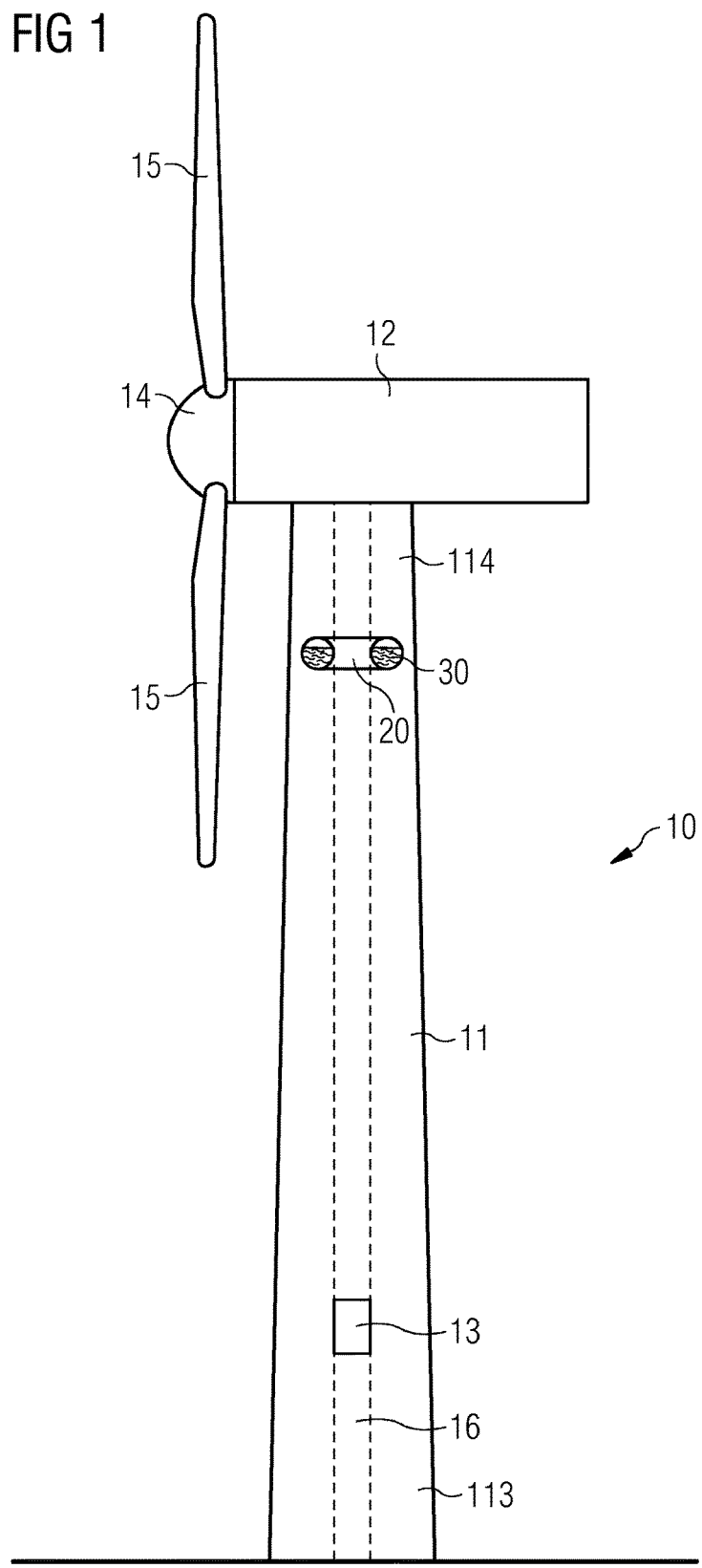
FIG. 1 shows an embodiment of wind turbine with a damper.

FIG. 1 shows a wind turbine 10 comprising a tower 11 with a base 113 and a top 114. At the top 114 of the tower 10 a nacelle 12 is placed. The nacelle 12 accommodates a generator (not shown) and a rotor (not shown) of the wind turbine 10. At one side of the nacelle 12, a hub 14 is mounted. The hub 14 is mounted rotatable with regard to the nacelle 12. The hub 14 is provided with three rotor blades 15, of which two are shown in FIG. 1. The wind turbine 10 might be a direct drive wind turbine without a gear box or might be a geared wind turbine with a gear box.

The height of the tower 11 might exceed 70 meters. Thus, it is convenient to incorporate an elevator 13 which connects the base 113 of the tower 10 with the top 114 of the tower 10. The elevator 13 is basically used for the service personal which needs to access the nacelle 12, the hub 14 or the rotor blades 15. Alternatively, stairs or a ladder may also be installed inside of the tower 11. The space which is needed and occupied by the elevator 13 is referred to as space 16 for the elevator 13. Close to the top 114 of the tower 11 a damper 20 with a shape of a toroid is located. The damper 20 comprises a container 40 which is filled with a liquid 30. The damper 20 is placed close to the space 16 for the elevator 13.

An objective of the damper 20 is to damp or reduce movements of the tower 11. These movements may be linear movements in a plane perpendicular to the tower 11 or circular or elliptical movements. Also vertical movements in a direction in parallel to the tower 11, as they might be induced by an earthquake, might be damped by the damper 20. The movements may be oscillating movements. Due to the mass of the liquid 30, a force which is acting against the movement of the tower 11 is damping this movement.

Figure 2:
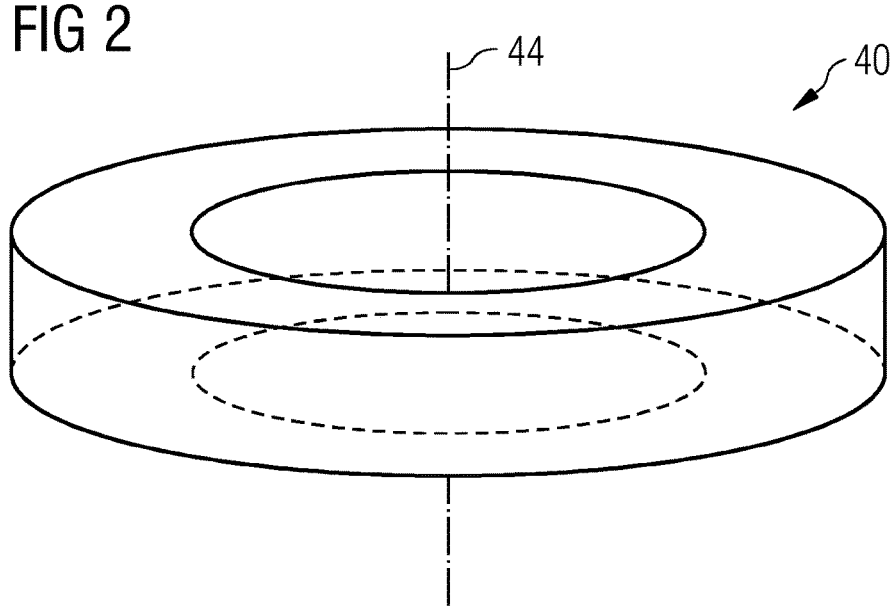
FIG. 2 shows an embodiment of a toroid with a shape of a hollow cylinder.
Figure 3:
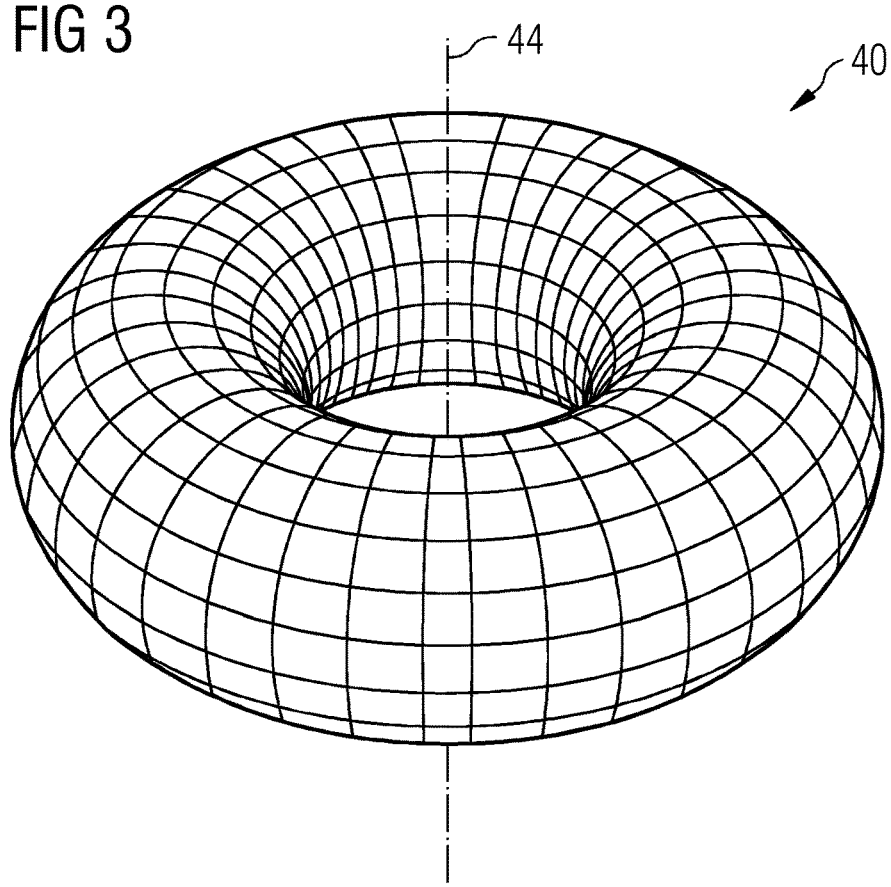
FIG. 3 shows an embodiment of a donut-shaped toroid.

FIGS. 2 and 3 show two embodiments of a toroid.

FIG. 2 shows a toroid that is generated by revolving a rectangle about an axis of symmetry 44. The resulting object or body may also be denoted as a hollow cylinder.

FIG. 3 shows a toroid that results from revolving a circle about an axis of symmetry 44. The body that is generated by the revolving circle is also denoted as an O-ring or as a donut.

The embodiments shown in FIGS. 2 and 3 represent two embodiments of a toroid which are particularly strong and simple at the same time and which thus are well-suited to act as the shape of a container 40 of a damper 20.

Figure 4:
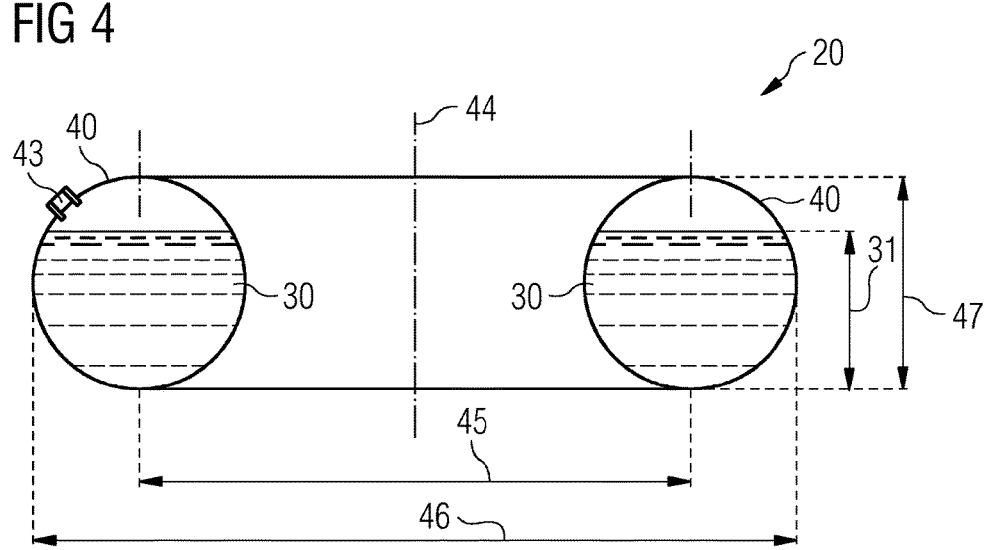
FIG. 4 shows an embodiment of a damper with a hole.

FIG. 4 shows a cross sectional view of a damper 20 comprising a container 40 with a shape of a toroid, in particular a toroid which comprises two circles in a cross sectional view. The container 40 may be characterized by three basic quantities: a diameter 45, an outer diameter 46, and a height 47. Note that in the case that the container 40 does not have a circular shape in the cross sectional view as shown in FIG. 4 but a random geometrical shape, the diameter 45 might be substituted by an inner diameter.

In the example shown in FIG. 4, the container 40 is filled with a liquid 30. The filling level 31 is determined by the relative size with regard to the height 47 of the container 40. In the example of FIG. 4, the filling level is about 70%.

It is advantageous to incorporate a hole 43 at the container 40 in order to facilitate evacuation of the container 40 or refill of the container 40. Finally, FIG. 4 also shows the axis of symmetry 44 of the damper 20 and the container 40.

Figure 5:
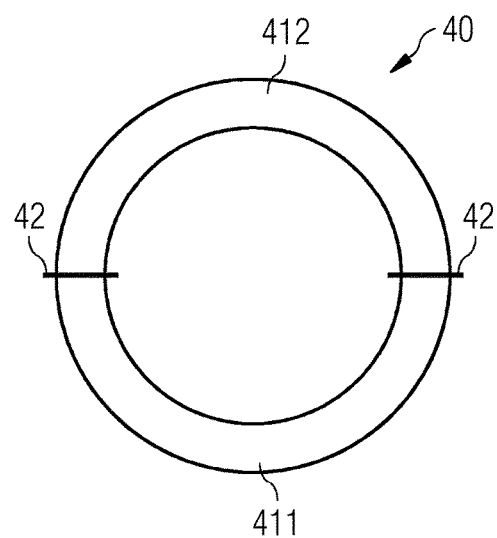
FIG. 5 shows an embodiment of a damper comprising a first toroidal segment and a second toroidal segment which are attached together.
Figure 6:
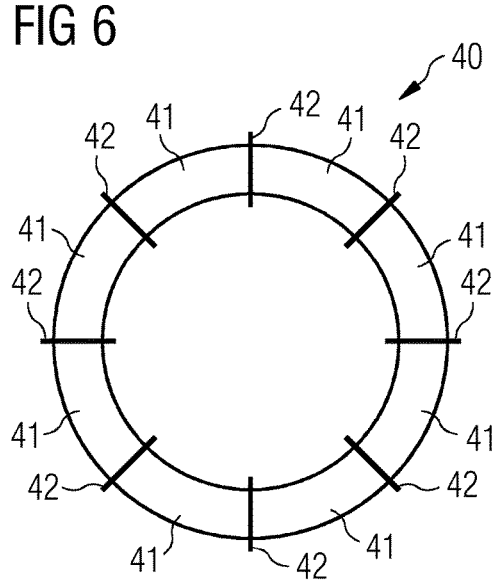
FIG. 6 shows an embodiment of a damper with eight toroidal segments.

FIGS. 5 and 6 show two embodiments of a container 40 in a top view.

FIG. 5 shows a container 40 comprising a first toroidal segment 411 and a second toroidal segment 412. Both toroidal segments 411, 412 are similar in size and shape. The first toroidal segment 411 and the second toroidal segment 412 are attached with each other by means of two assembly flanges 42.

While the toroidal segments 411, 412 in FIG. 5 comprise the shape of a half annulus, the toroidal segments 41 depicted in FIG. 6 comprise the shape of one-eighth of an annulus. All eight toroidal segments 41 are similar in size and shape. They are linked or attached together by assembly flanges 42. Thus, the circular container 40 in FIG. 6 comprises eight toroidal segments 41 and eight assembly flanges 42. In addition to the fact that the toroidal segments 41 are readily available they are also easy to transport to the site of the installation of the wind turbine and are beneficially just assembled together at or during installation of the wind turbine. This is a considerable advantage compared to the state of the art of a damper manufactured in one single piece.

Figure 7:
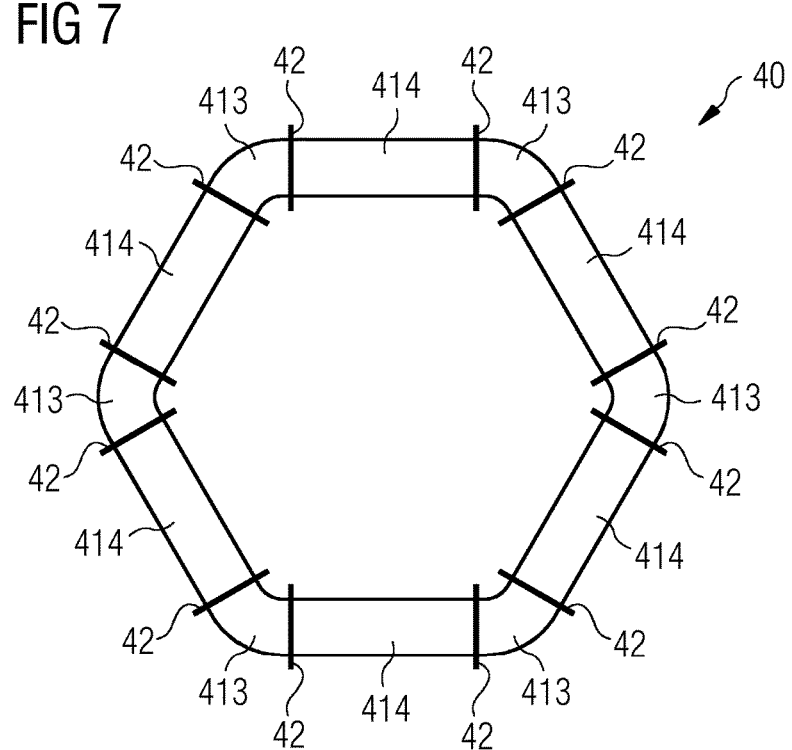
FIG. 7 shows an embodiment of a damper with a plurality of straight toroidal segments and a plurality of bent toroidal segments.

FIG. 7 shows another embodiment of a container 40, shown in a top view. In contrast to the FIGS. 5 and 6, FIG. 7 shows a container 40 which comprises not only bent toroidal segments 413 but also straight toroidal segments 414. As a result and after connecting the bent and the straight toroidal segments 413, 414 a container 40 with a polygonal shape is obtained.

Figure 8:
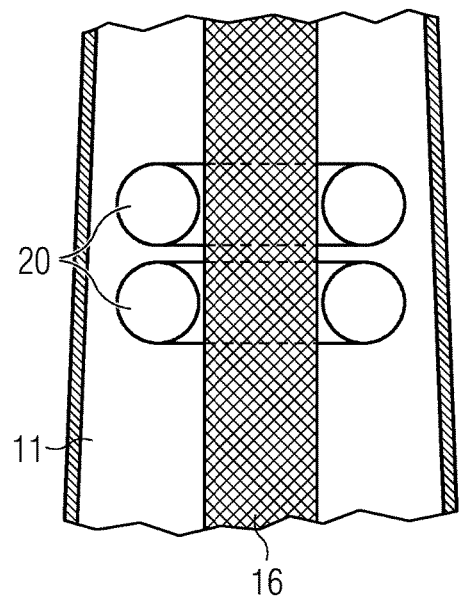
FIG. 8 shows embodiments of two large liquid dampers installed inside a tower of a wind turbine.
Figure 9:
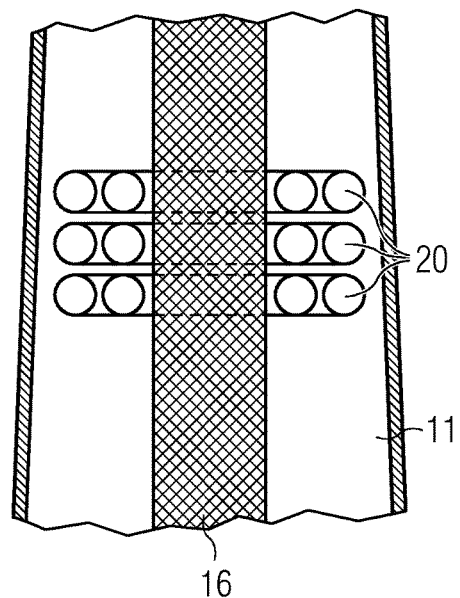
FIG. 9 shows embodiments of three double liquid dampers installed inside a tower of a wind turbine.

FIGS. 8 and 9 show a part of a tower 11 of a wind turbine 10. The tower 11 is delimited by tower walls and comprises a space 16 which is suited for an elevator or guiding cables from the base of the tower 11 to the top of the tower 11.

FIG. 8 shows two dampers 20 stacked upon each other.

FIG. 9 shows three dampers 20 stacked upon each other, wherein each damper 20 comprises two toroidal containers, thus resulting in a double damper. The design and in particular the size of the damper 20 directly influences the damping characteristics, for instance the damping frequency of the system.

Figure 10:
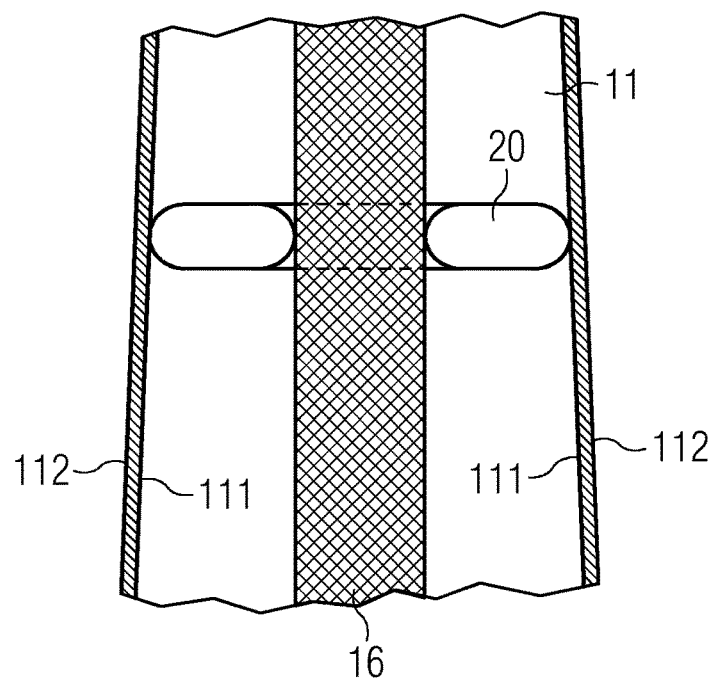
FIG. 10 shows an embodiment of a damper which extends to the inner walls of a tower of a wind turbine.

FIG. 10 shows a damper 20 with an elliptical shape shown in a cross sectional view. The size of the damper is chosen such that it extends from the space 16 suited for the elevator until the inner walls 111 of the tower 11. Such a design allows for a maximum exploitation of the space available inside the tower 11.

Figure 11:
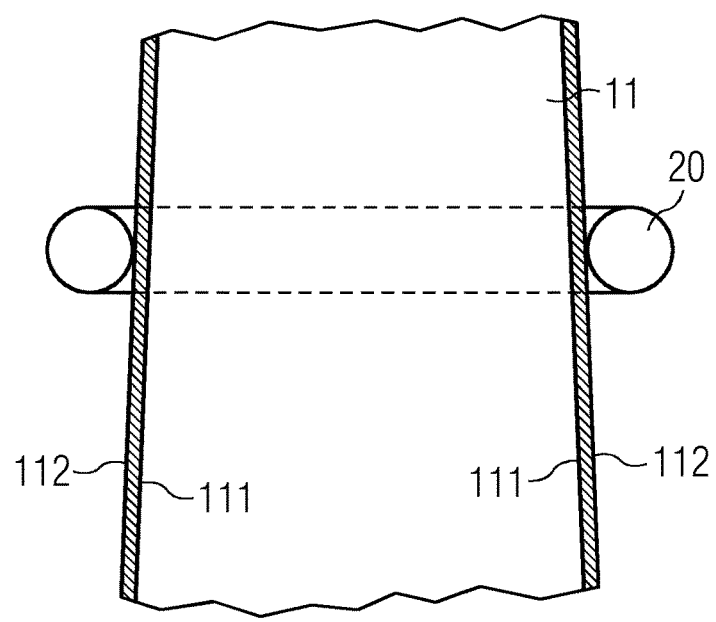
FIG. 11 shows an embodiment of a damper which is placed at the outer walls of a tower of a wind turbine.

FIG. 11 shows an example of an external damper 20 that is attached to outer walls 112 of the tower 11. An external damper 20 is advantageous if, for instance, not enough space inside the tower 11 is available or, for instance, if the damper only has to be installed provisionally and is meant to be disassembled shortly after being mounted to the tower 11.

Figure 12:
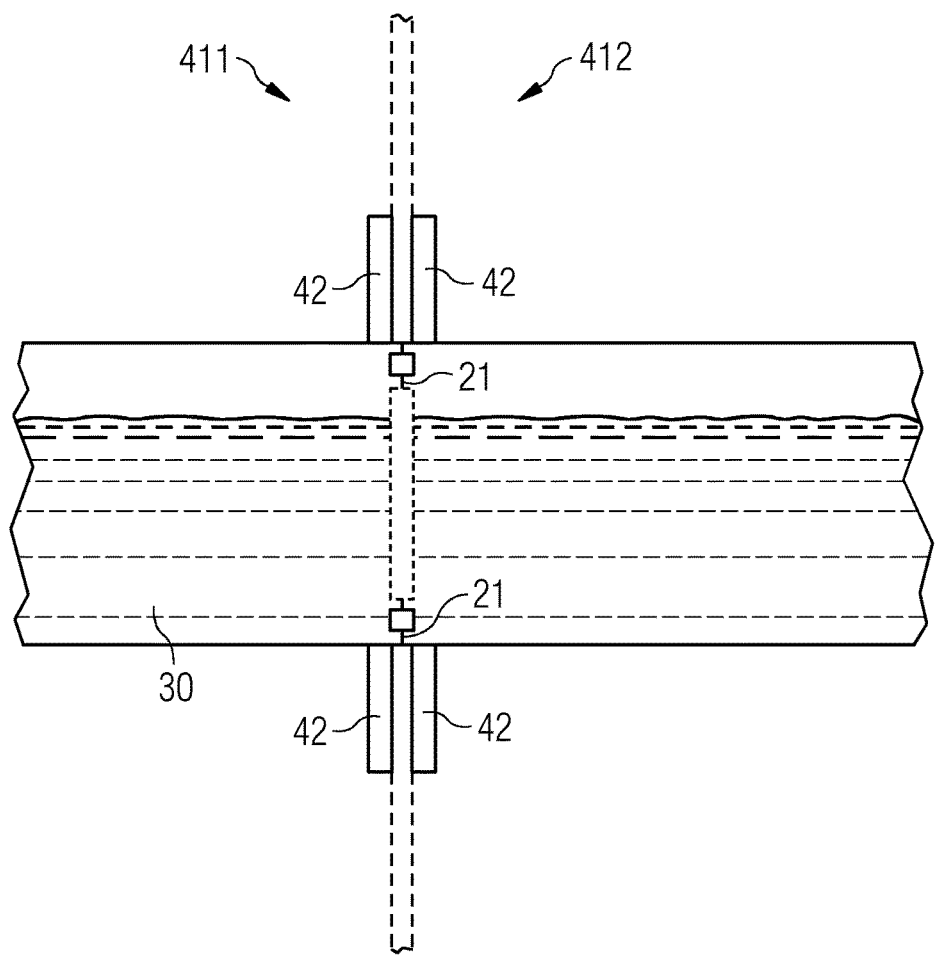
FIG. 12 shows embodiments of two toroidal segments which are attached together by means of an assembly flange and with a flow obstacle.

FIG. 12 shows a first toroidal segment 411 which is connected with a second toroidal segment 412 by means of an assembly flange 42. Note that between the first part of the assembly flange 42 belonging to the first toroidal segment 411 and the second part of the assembly flange 42 belonging to the second toroidal segment 412, a flow obstacle 21 is incorporated. The flow obstacle 21 decreases the diameter of the two toroidal segments 411, 412. Such a flow obstacle 21 is also called a baffle. The FIG. 12 also shows a liquid 30 that is filled into the toroidal segments 411, 412 with a filling level of approximately 70%.

Figure 13:
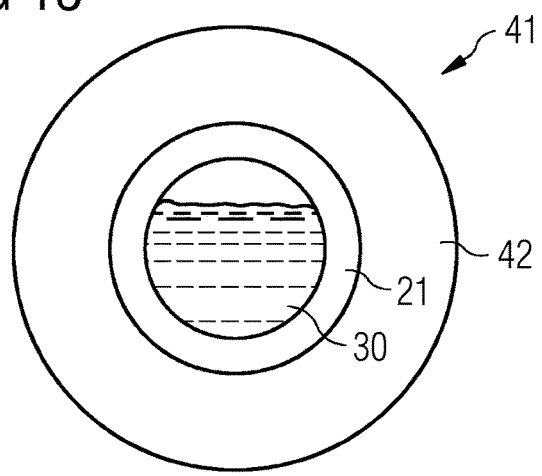
FIG. 13 shows an embodiment of a toroidal segment with a flow obstacle in a cross sectional view.

Finally, FIG. 13 shows a cross sectional view of a toroidal segment which is filled with a liquid 30 and where the size, in particular the diameter of the assembly flange 42, and the flow obstacle 21 can be well seen. Note that due to the flow obstacle 21 a flow of the liquid 30 is still possible, i.e. a flow through the toroidal segment 41 is still possible; however, the flow is hampered, i.e. obstructed.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A damper comprising:
a container and a liquid, the liquid being located inside the container, the container having a first toroidal segment and at least a second toroidal segment, wherein the container is disposed proximate a top of a tower of a wind turbine to dampen a movement of the wind turbine;
wherein the first toroidal segment and the second toroidal segment are attached together such that a closed toroid is generated and the liquid is retained inside the container.

2. The damper according to claim 1, wherein the closed toroid is symmetric about an axis of symmetry, and a shape of the closed toroid is generated by revolving an ellipse about the axis of symmetry.

3. The damper according to claim 1, wherein the damper is located inside at the tower.

4. The damper according to claim 1, wherein the damper comprises an aperture at its center which is large enough to give space to an elevator of the tower connecting a base of the tower with the top of the tower.

5. The damper according to claim 1, wherein the damper extends to inner walls of the tower.

6. The damper according to claim 1, wherein the damper is located outside of the tower.

7. The damper according to claim 1, wherein the wind turbine comprises a nacelle, and the damper is placed at the nacelle.

8. The damper according to claim 1, wherein the liquid is mixed with clay and/or silt.

9. The damper according to claim 1, wherein a filling level of the liquid inside the container is between 20% and 80%.

10. The damper according to claim 1, wherein the first toroidal segment and the second toroidal segment are attached together by means of an assembly flange, which is made of steel.

11. The damper according to claim 10, wherein the damper comprises at least one flow obstacle inside the container.

12. The damper according to claim 11, wherein the at least one flow obstacle is placed at the assembly flange.

13. The damper according to claim 1 wherein the container comprises toroidal segments that are shaped as bent toroidal segments.

14. The damper according to claim 1, wherein the container comprises toroidal segments that are shaped as bent toroidal segments, and further toroidal segments which are shaped as straight toroidal segments.

15. The damper according to claim 14, wherein a number of the bent toroidal segments equals a number of the straight toroidal segments, and each of the bent toroidal segments is directly neighbored by a straight toroidal segment of the straight toroidal segments.

16. The damper according to claim 1, wherein the container comprises a hole for evacuating the liquid from the container.

* * * * *